United States Patent [19]

Kurakake et al.

[11] Patent Number: 5,013,989
[45] Date of Patent: May 7, 1991

[54] NUMERICAL CONTROL APPARATUS FOR MULTIPLE-AXIS AND MULTIPLE-CHANNEL MACHINE TOOL

[75] Inventors: Mitsuo Kurakake, Hino; Jiro Kinoshita, Minamitsuru, both of Japan

[73] Assignee: Fanuc Ltd., Minamitsuru, Japan

[21] Appl. No.: 427,846

[22] PCT Filed: Feb. 16, 1989

[86] PCT No.: PCT/JP89/00157

§ 371 Date: Oct. 10, 1989

§ 102(e) Date: Oct. 10, 1989

[87] PCT Pub. No.: WO89/08288

PCT Pub. Date: Sep. 8, 1989

[30] Foreign Application Priority Data

Feb. 26, 1988 [JP] Japan .................... 63-043962

[51] Int. Cl.[5] .......................................... G05B 11/32
[52] U.S. Cl. ............................ 318/625; 318/562; 318/564; 318/560
[58] Field of Search ..................... 318/560–646; 364/513, 474.11; 901/3, 9, 15, 12, 18–23

[56] References Cited

U.S. PATENT DOCUMENTS

| | | | |
|---|---|---|---|
| 3,641,326 | 2/1972 | Harte | 318/562 X |
| 4,029,952 | 6/1977 | Haga | 318/569 X |
| 4,047,003 | 9/1977 | LaRocca et al. | 318/562 X |
| 4,262,336 | 4/1981 | Pritchard | 364/474.11 |
| 4,277,731 | 7/1981 | Pongracz | 318/562 X |
| 4,288,849 | 9/1981 | Yoshida et al. | 318/562 X |
| 4,408,280 | 10/1983 | Bedini et al. | 318/571 X |
| 4,435,771 | 3/1984 | Nozawa et al. | 318/562 X |
| 4,473,785 | 9/1984 | Kurakake | 318/560 |
| 4,503,507 | 3/1985 | Takeda et al. | 901/8 X |
| 4,580,207 | 4/1986 | Arai et al. | 364/474.11 |
| 4,607,327 | 8/1986 | Kishi et al. | 318/569 X |
| 4,608,645 | 8/1986 | Niwa et al. | 318/572 X |
| 4,684,861 | 8/1987 | Kawamura et al. | 318/567 |
| 4,684,862 | 8/1987 | Rohrle | 318/568.2 |
| 4,841,431 | 6/1989 | Takagi et al. | 364/474.11 X |
| 4,873,476 | 10/1989 | Kurakake et al. | 318/568.22 |
| 4,882,670 | 11/1989 | Isobe et al. | 364/474.11 X |

*Primary Examiner*—Paul Ip
*Attorney, Agent, or Firm*—Staas & Halsey

[57] ABSTRACT

A numerical control apparatus for controlling a multiple-axis and multiple-channel machine tool by controlling multiple axes through multiple channels. A main processor (1) for executing data processings other than servo system processing, and an operator interface module (2), etc. are connected to a first bus (7). A plurality of servo command generating processors (10, 20, 30) for processing input data and producing a servo command for each channel are connected to the first bus (7) and a second bus (41). The second bus (41), which is connected to a plurality of servo control processors (42–45), transfers only servo command data and the first bus (7) transfers all other data. Accordingly, servo commands can be produced at a high speed, and thus a high-speed control of a multiple-axis and multiple-channel machine tool can be effected.

10 Claims, 3 Drawing Sheets

FIG. 4

```
                                PROGRAM ADDRESS
                                IN CHANNEL

CHANNEL-1   ⎧  X 1        ( X )
            ⎪  Z 1        ( Z )
            ⎨  C          ( C )
            ⎩  Z 2        ( Y )

CHANNEL-2   ⎧  X 2        ( X )
            ⎪  Z 2        ( Z )
            ⎨  C          ( C )
            ⎩  Z 1        ( Y )

CHANNEL-3   ⎧  Z 3        ( Z )
            ⎩  X 1        ( X )
```

NUMERICAL CONTROL APPARATUS FOR MULTIPLE-AXIS AND MULTIPLE-CHANNEL MACHINE TOOL

BACKGROUND OF THE INVENTION a. Field of the Invention

The present invention relates to a numerical control apparatus for controlling a multiple-axis and multiple-channel machine tool by controlling multiple axes through multiple channels, and more particularly, to a numerical control apparatus for controlling a multiple-axis and multiple-channel machine tool, provided with two buses and a plurality of servo command generating processors to enable data to be processed at a high speed.

b. Description of the Related Art

In a numerical control machine tool, a multitude of tool posts are provided so that a workpiece can be machined by a plurality of tools, to effect a higher speed machining of the workpiece.

FIG. 3 shows a schematic diagram of a numerical control lathe for use as a multiple-axis and multiple-channel machine tool having a plurality of tool posts, as an example of such a numerical control machine tool. In FIG. 3, numeral 61 denotes a main spindle, which is controlled in a Z-direction along a Z1-axis. In the numerical control lathe, the Z-axis is driven in synchronism with the rotation of the main spindle 61.

Numeral 62 denotes a first tool post, which is controlled only in an X-direction along an X1-axis. Namely, the main spindle 61 and the first tool post 62 constitute normal X-Z coordinates.

Numeral 63 denotes a second tool post, which is controlled in the X- and Z-directions along X2- and Z2-axes. When the main spindle 61 does not move along the Z1-axis, the second tool post 63 is driven at independent X-Z coordinates, but when the main spindle 61 does move in the Z1-axis direction, the movement of the second tool post 63 must take into account this movement in the Z1-axis direction, so that the movement of the Z2-axis is superposed on that of the Z1-axis. In other words, the Z2-axis must be moved for a distance equivalent to the sum of the original stroke of the Z2-axis and the stroke of the Z1-axis.

Numeral 64 denotes a third tool post, which is controlled only in the Z-axis direction along a Z3-axis. The movement of the Z3-axis is also superposed on that of the Z1-axis.

Control of a multitude of axes is effected by controlling the axes according to paths or channels. FIG. 4 shows the relationships between the channels and the axes to be controlled. As shown in FIG. 4, the X1-, Z1-, C-, and Z2-axes are controlled in a channel-1, the X2-, Z2-, C-, and Z1-axes are controlled in a channel-2, and the Z3- and X1-axes are controlled in a channel-3. The parenthesized alphabetical letters shown in FIG. 4 indicate program addresses in the channels.

One and the same axis is contained in a plurality of channels so that each axis is controlled in the individual channel, depending on the machining condition. For example, the C-axis is controlled in the channel-1 when the workpiece is machined by using the main spindle 61 and the first tool post 62, and is controlled in the channel-2 when the workpiece is machined by using the main spindle 61 and the second tool post 63.

In a conventional numerical control apparatus used for such a multiple-axis and multiple-channel machine tool, the operational capacity of processors is not sufficient for the processing of data input from a multitude of channels and the generation of servo commands for a multitude of axes. Namely, the machining speed is lowered, that is, a required machining speed cannot be obtained, and thus the advantages of the multiple-axis and multiple-channel machine tool cannot be fully realized.

SUMMARY OF THE INVENTION

The present invention has been created in consideration of these circumstances, and an object thereof is to provide a numerical control apparatus for controlling a multiple-axis and multiple-channel machine tool, provided with two buses and a plurality of servo command generating processors to enable data to be processed at a high speed.

To solve the above problem, according to the present invention, there is provided a numerical control apparatus for controlling a multiple-axis and multiple-channel machine tool by controlling multiple axes through multiple channel the numerical control apparatus for controlling the multiple-axis and multiple-channel machine tool being characterized by comprising a main processor for executing data processings other than a servo system processing, a first bus connected to the main processor, an operator interface module, and the like, a plurality of servo command generating processors connected to the first bus and a second bus and adapted to process input data and produce a servo command for each channel, and a plurality of servo control processors connected to the second bus and adapted to control a servomotor.

The buses are classified into those for a servo system and those for other uses, and further, the plurality of servo command generating processors are provided exclusively for the processing of input data and the generation of servo commands. Accordingly, servo command data can be produced at a high speed, and thus a multiple-axis and multiple-channel machine tool can be used for a high speed machining.

BRIEF DESCRIPTION OF THE DRAWINGS

FIG. 4 is a diagram showing the relationships between channels and axes to be controlled.

DESCRIPTION OF THE PREFERRED EMBODIMENT

One embodiment of the present invention will now be described with reference to the drawings.

Figure 1:
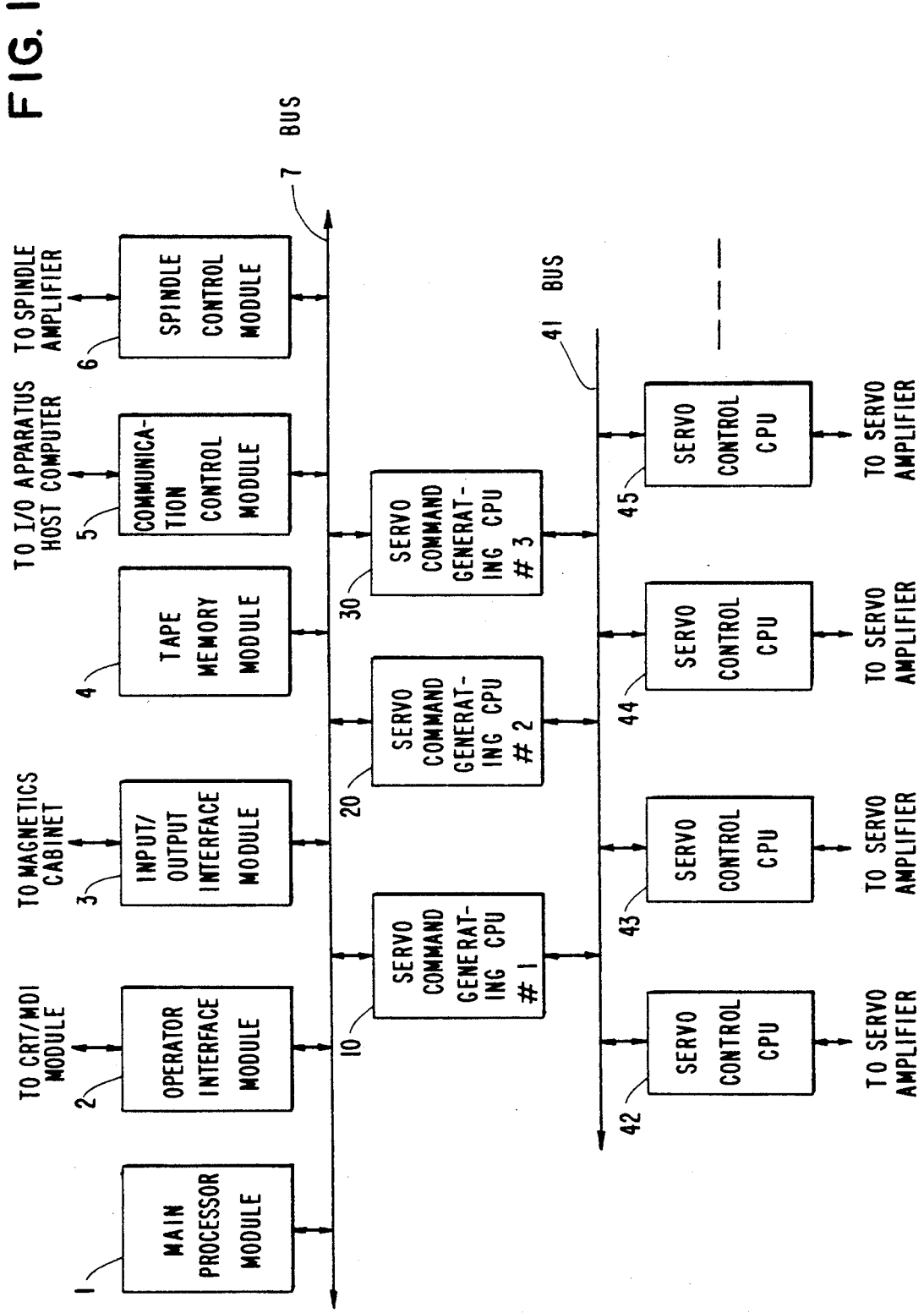
FIG. 1 is a block diagram of a numerical control apparatus for controlling a multiple-axis and multiple-channel machine tool according to the present invention.

FIG. 1 shows a block diagram of a numerical control apparatus for controlling a multiple-axis and multiple-channel machine tool according to the present invention. In FIG. 1, numeral 1 denotes a main processor module for global control, which controls data other than servo commands. Although only one main processor module is shown in FIG. 1, a plurality of main processor modules are used in accordance with the size of the system.

Numeral 2 denotes an operator interface module, which is connected to a CRT/MDI unit including a display device and a keyboard; 3 denotes an input/output interface module, which receives input signals from the machine side and delivers signals for driving a magnet of a magnetics cabinet and the like.

Numeral 4 denotes a tape memory module which stores a machining program. A bubble memory or a RAM backed up by a battery for example may be used as the memory element.

Numeral 5 denotes a communication control module which is connected to a host computer as well as to the numerical control apparatus and performs the management of machining processes, reception of the machining program, and transmission of machining data, etc. Further, the module 5 can be connected to an I/0 apparatus, such as a floppy disk drive unit or hard disk drive unit, etc. Numeral 6 denotes a main-spindle control module which controls the rotating speed of a main spindle, and orientation, etc. and is connected to a spindle amplifier.

These modules are connected to a bus 7. The bus 7 is a multi-master bus.

Figure 3:
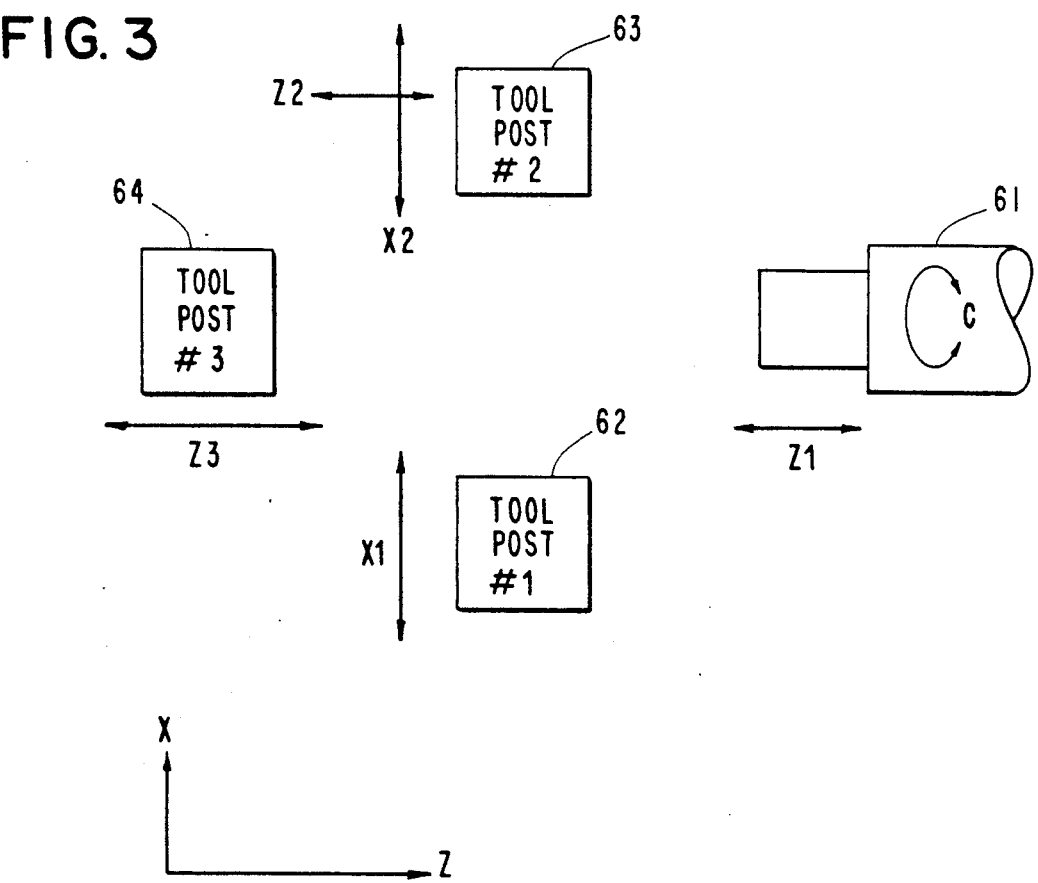
FIG. 3 is a schematic diagram of a numerical control lathe as a multiple-axis and multiple-channel control machine tool having a plurality of tool posts.

Numeral 10 denotes a first servo command generating processor which receives machining program data for a channel-1 and produces servo commands for the X1-, Z1-, C-, and Z2-axes of FIG. 3. Similarly, a second servo command generating processor 20 produces servo commands for axes contained in a channel-2, and a third servo command generating processor 30 produces servo commands for axes contained in a channel-3. The servo command generating processors will be described in detail later.

Numeral 41 denotes a bus through which only the servo commands or data for servo control are transferred; 42 denotes a servo control processor which controls a servomotor-1-axis, e.g., the X1-axis, and is connected to a servo amplifier for the X1-axis. Similarly, numeral 43 denotes a servo control processor for controlling a Z1-axis; 44 denotes a servo control processor for controlling the C-axis; and 45 denotes a servo control processor for controlling the Z2-axis, the processors being connected to corresponding servo amplifiers. Other servo control processors are omitted from FIG. 3.

Figure 2:
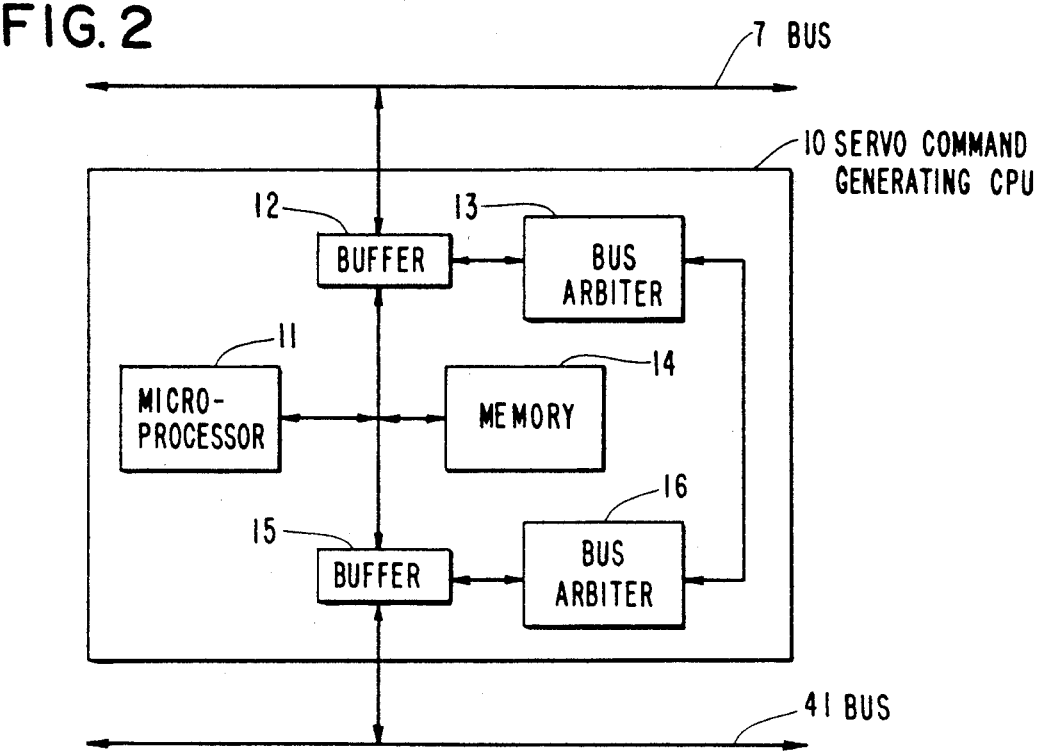
FIG. 2 is a block diagram of a servo command generating processor.

FIG. 2 shows a servo command generating processor in detail, wherein 10 denotes the servo command generating processor, 11 denotes a microprocessor which receives movement data for-, the individual axes of the channel-1 from the bus 7 and produces servo commands for the individual axes, 12 denotes a buffer for an internal bus and the bus 7, and 13 denotes a bus arbiter which arbitrates use of a bus for the microprocessor 11.

Numeral 14 denotes a memory which temporarily stores a movement command for a control axis of the channel-1. The microprocessor 11 produces the servo commands for the individual axes, and the servo command data is transferred to the individual servo control processors via the bus 41. Numeral 15 denotes a buffer, and numeral 16 denotes a bus arbiter which arbitrates use of the bus 41 for the microprocessor 11.

Namely, the bus 41 for transferring the servo command data, the bus 7 for transferring other data, and servo command generating processors 10, 20, and 30 for generating a plurality of servo commands are provided, and therefore, the generation of the servo commands can be processed at a high speed, and thus the multiple-axis and multiple-channel machine tool can be controlled at a high speed.

Although a numerical control lathe has been described above as the multiple-axis and multiple-channel control machine tool, the present invention may be also applied to other multiple-axis and multiple-channel control machine tools, such as a machining center.

According to the present invention, as described above, the bus for transferring the servo command data, the bus for transferring other data, and servo command generating processors for generating a plurality of servo commands are provided, and therefore, the generation of the servo commands can be processed at a high speed, and thus the multiple-axis and multiple-channel machine tool can be controlled at a high speed.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to as falling within the scope of the invention.

What is claimed is:

1. In a numerical control apparatus for controlling a multiple-axis and multiple-channel machine tool by controlling multiple axes through multiple channels, said numerical control apparatus comprising:
   a main processor for executing data processing other than servo system processing;
   a first bus connected to said main processor;
   a second bus for transferring servo command data;
   a plurality of servo command generating processors, connected to said first bus and said second bus, for processing input data to produce a servo command for each channel; and
   a plurality of servo control processors, connected to said second bus, for controlling a servomotor.

2. A numerical control apparatus according to claim 1, wherein said first and second buses are multi-master buses.

3. A numerical control apparatus according to claim 1,
   wherein said numerical control apparatus further comprises an operator interface module; an input/output interface; a tape memory module; a communication control module; and a main-spindle control module, and
   wherein said first bus is further connected to said operator interface module, said input/output interface module, said tape memory module, said communication control module, and said main-spindle control module.

4. A numerical control apparatus according to claim 1, wherein the multiple-axis and multiple-channel machine tool is a numerical control lathe.

5. A numerical control apparatus according to claim 1, wherein the multiple-axis and multiple-channel machine tool is a machining center.

6. A numerical control apparatus for controlling a machine tool having multiple axes and multiple channels, each axis having a servomotor corresponding thereto, said apparatus comprising:

main processor means for processing all data except servo command data;

a plurality of servo command processing means for receiving the servo command data corresponding to one of the channels and for producing servo commands by processing the servo command data, each servo command processing means produces servo commands for axes associated with one of the channels;

first bus means for operatively connecting said main processor means and said plurality of servo command processing means;

a plurality of servo control means, each corresponding to one of the axes, for receiving the servo commands corresponding to the one of the axes from at least one of said servo command processing means and for controlling the servomotor corresponding thereto; and second bus means operatively connecting said plurality of servo command processing means and said plurality of servo control means.

7. A numerical control apparatus according to claim 6, wherein said apparatus further comprises storage means for storing a machining program, the machining program includes the servo command data, and wherein said storage means is operatively connected to said first bus means.

8. A numerical control apparatus according to claim 6, wherein each of said plurality of servo command processing means includes an internal bus;

internal processing means, operatively connected to said internal bus, for producing the servo commands; and bus arbiter means, operatively connected to said internal processing means and said first, second and internal buses, for connecting said internal processing means to one of said first and second buses via said internal bus.

9. A numerical control apparatus according to claim 8, wherein the machine tool is a numerical control lathe.

10. A numerical control apparatus according to claim 8, wherein the machine tool is a machining center.

* * * * *